(No Model.) 2 Sheets—Sheet 2.

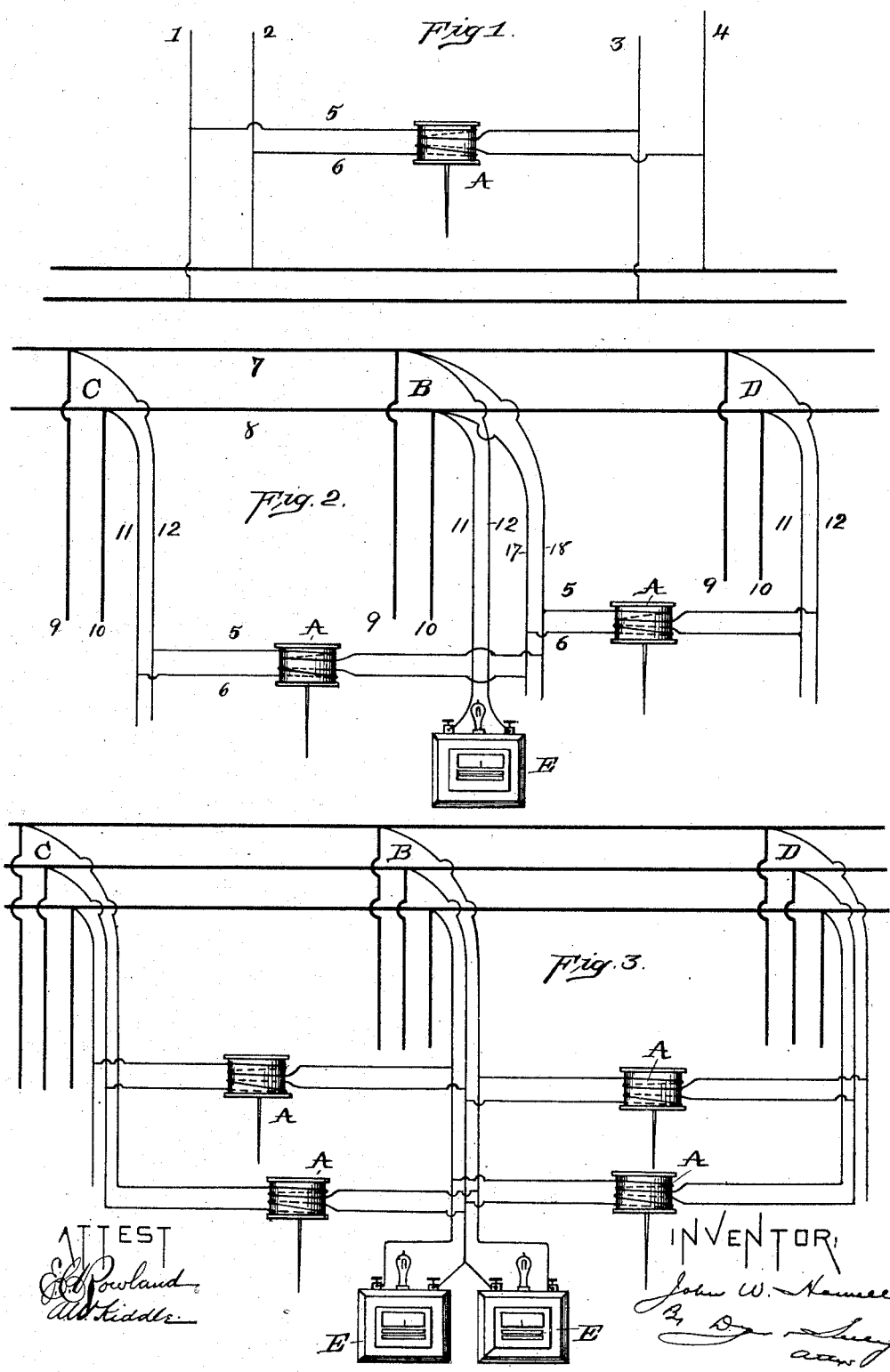

J. W. HOWELL.
SYSTEM OF ELECTRICAL DISTRIBUTION.

No. 352,691. Patented Nov. 16, 1886.

ATTEST:
E. C. Rowland
L. W. Fiddler

INVENTOR:
John W. Howell
By Dyer & Seely
attys

UNITED STATES PATENT OFFICE.

JOHN W. HOWELL, OF NEW BRUNSWICK, NEW JERSEY.

SYSTEM OF ELECTRICAL DISTRIBUTION.

SPECIFICATION forming part of Letters Patent No. 352,691, dated November 16, 1886.

Application filed April 15, 1886. Serial No. 198,891. (No model.)

*To all whom it may concern:*

Be it known that I, JOHN W. HOWELL, of New Brunswick, in the county of Middlesex and State of New Jersey, have invented a certain new and useful Improvement in Systems of Electrical Distribution, of which the following is a specification.

My invention relates to a novel method and apparatus for indicating or regulating the pressure of electrical circuits, and especially those in a system of electrical distribution, by which I am enabled to use instruments of very much simpler construction than those now in use, and which instruments will not be liable to get out of adjustment.

In the installation of distributing systems it is considered essential to keep the pressure the same at several points in the system, these points being the ends of the feeders where they join the distributing-mains. In order to keep the pressure at these points the same, pressure-wires are run back from them to the station, and indicators are connected with these wires, which show the pressure, and enable the feeders to be properly adjusted to correct the pressure at their outer ends. The indicators heretofore employed have been absolute instruments—that is, each is connected directly to the two wires whose difference of potential is to be kept constant—and the electromotive force of the lines is applied directly to the indicator, which indicates directly the pressure at that point, so that an absolute measure of the pressure at each of these points is had, and each of the indicators which measures this pressure must be kept in accurate adjustment independently of all the others. These indicators are liable to get out of adjustment at any time and cause a wrong pressure to be kept at one or more feeders. In the system invented by me these absolute indicators are used at one point in the system only, and the pressure at all the other points is measured by comparing it electrically with the pressure at this point—that is to say, electrical forces derived from two points are made to have a cumulative or differential action upon an instrument whose movement is the resultant of such forces. The same principle can also be applied for automatic regulation as well as indication.

Figure 4:
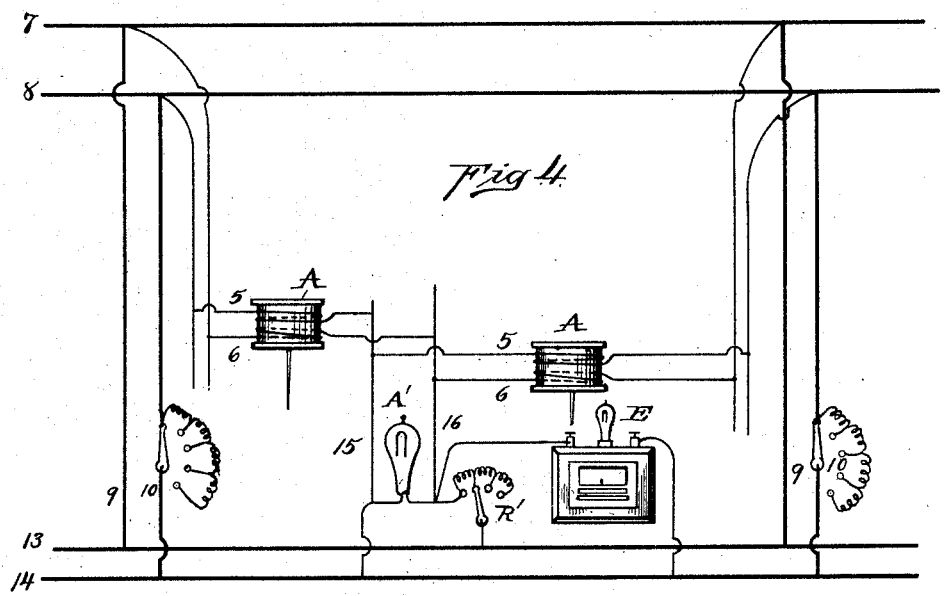
Figure 5:
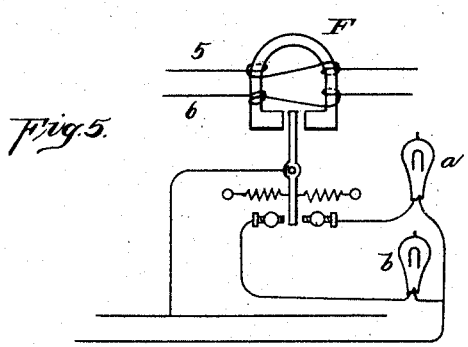
Figure 6:
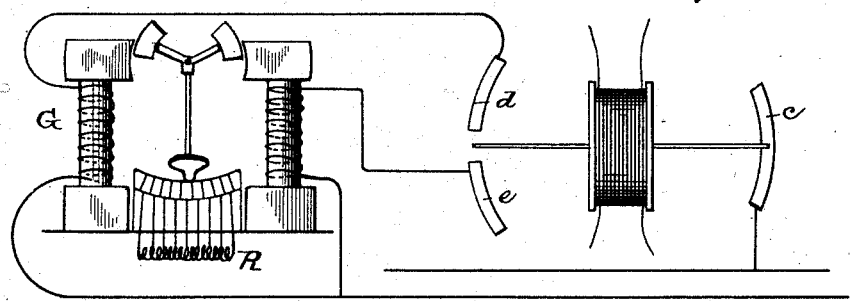

In the accompanying drawings, forming a part hereof, Figure 1 is a view in diagram illustrating the principle of the invention; Fig. 2, a similar view, showing the application of the invention for indication to a two-wire multiple-arc system of electrical distribution; Fig. 3, a similar view, showing the invention applied for indication to a three-wire or compensating system of distribution; Fig. 4, a similar view, showing the preferred arrangement of the indicators in a system station; Fig. 5, a view, partly in diagram, of a modified form of comparative indicator; Fig. 6, a view, partly in diagram, illustrating the invention applied for automatic regulation.

In explanation of the principle involved in the invention, reference may be had to the simple illustration, Fig. 1. Consider that it is desired to maintain at the same constant the pressure in the circuits 1 2 and 3 4, and that 1 2 is provided with an absolute indicator of any known form, which shows the difference of potential between 1 and 2.

To show whether or not the pressure at 3 4 is the same as at 1 2, I produce an electrical comparison of the pressures of the two circuits by connecting the positive conductors 1 and 3 of the two circuits together by a bridge-wire, 5, and the negative conductors 2 and 4 by a similar bridge-wire, 6. In these two bridge-wires is located a comparative instrument, A. This is a differentially-wound instrument, so that equal currents flowing in the same direction across the bridge-wires will neutralize each other, and currents flowing in opposite directions across the bridge-wires will act together in producing movement of the instrument. This instrument A may be a high-resistance differential galvanometer, with one coil in bridge-wire 5 and the other coil in bridge-wire 6. It is shown as a differential galvanometer by conventional illustration in all the figures, except Fig. 5. Suppose the potentials at 1 2 to be represented by 200 on the positive conductor 1, and by 100 on the negative conductor 2, and that the difference in potential 100 is the pressure it is desired to maintain constant in both circuits. If the potentials are the same at 3 4, no current flows through the galvanometer and the needle remains at zero. If at 3 4 there are potentials represented by 202 and 102, then in each bridge-wire and on each coil of galvanometer there is a current caused by a difference of potential of 2. As in each bridge-wire this flows from circuit 3 4 to 1 2, the currents neutralize each other, and there is no deflection. This is a correct indication, since the difference of potential at 3 4 is still 100. If at 3 4 there are potentials represented by 202 and 104, the currents in the galvanometer-coils will be in the same direction as before; but one being caused by 2 units and the other by 4 units, a deflection will be produced by the larger current, as it should be, since the difference of potential is 98 and not 100.

If at 3 4 we have 202 and 98, one coil of galvanometer will carry a current from circuit 3 4 to circuit 1 2, and one from 1 2 to 3 4, and these currents will act together on the needle and produce a deflection, as they should, showind the difference of potential as being 104.

The circuit 1 2 will be regulated by reference to its absolute indicator, while circuit 3 4, and as many other circuits as may be connected with 1 2 in the same manner, will be regulated by reference to their respective instruments A; or these instruments can be utilized to effect the regulation automatically, as will be presently explained.

In Fig. 2 the application of the invention for indication upon a two-wire system of distribution is shown. The street-mains are illustrated by 7 8. From the street-mains at points B, C, and D, are taken feeders 9 10, supplying current to the mains from the central station, and corresponding with the feeders are pressure-wires 11 12, running from points B, C, and D on mains back to the station. The feeders will have adjustable resistances R for regulation. Hand-adjusted resistances for this purpose are shown in Fig. 4, and an automatically-adjusted resistance is shown in Fig. 6.

To the pressure-wires from B is connected the absolute indicator E. This may be the lamp-indicator shown in my Patent No. 339,058, or any other suitable indicator. Bridge-wires 5 6 connect an extra set of pressure-wires, 17 18, from B with those from C and D, and in these bridge-wires are located the differential galvanometers A. Thus indications will be had for regulating the three feeders to keep the desired pressure at the points B, C, and D.

For a three-wire system, Fig. 3, the pressure at B, between positive and neutral and between neutral and negative, is shown upon two absolute indicators, E, while four comparative indicators, A, show whether or not the pressure at C and D is the same as at B. In this figure, for clearness of illustration, the bridge-wires for comparative indicators are shown as connected with the same pressure-wires from point B, as are the absolute indicators.

The comparative indicators have a particular advantage in connection with a three-wire system of distribution, since they enable it to be determined whether current is flowing over the neutral wire of any feeder by a direct comparison of the potentials on the neutral wires of the two or more feeders. This is done by simply breaking the bridge-wires connecting positive conductors, as well as those connecting negative conductors, leaving the bridge-wires between neutral conductors alone in connection with the instruments. The comparative indicators then act as simple galvanometers, and show the differences in potential between the neutral conductors. Since the flow of current on neutral conductors indicates an unbalanced system, the comparative indicators enable the fault to be located and remedied.

I prefer, for a distributing system, to provide a standard pressure by a local station-circuit directly from the dynamos in station or the omnibus wires 13 14, into which they feed, and to compare the pressures at ends of feeders with this standard pressure. This is shown applied to a two-wire system in Fig. 4. The application to a three-wire system will take double the number of instruments, (the same number for each side or division of the circuit,) as will be understood from Fig. 3.

With reference to Fig. 4, an incandescent electric lamp, A', forming a fixed resistance, is connected with omnibus wires 13 14 in station, and has an adjustable resistance, R', in series with it. An absolute indicator, E, is connected in multiple arc with the lamp A', and by adjusting R' with reference to E the lamp can be kept at a candle-power giving the difference in potential between the lamp terminals that it is desired for outer ends of feeders. The bridge-wires, with their comparative indicators, are connected between the feeder pressure-wires and wires 15 16, running from the terminals of this lamp A'.

This invention, it will thus be seen, reduces the number of absolute indicators to one in a multiple-arc system, and to two in a three-wire system the pressure at all other points being shown on differential galvanometers, which, arranged for this purpose, I call "comparative" indicators. Central stations, as at present erected on the Edison system, use from eight to twelve indicators. Each of these is an absolute indicator, and has to be kept in adjustment independently of the others. This requires a great deal of attention and time, and if the instruments are not kept in adjustment they will give wrong indications. The comparative indicators, however, require no adjustment after being once set up; and as it is only necessary to keep one or two absolute indicators in adjustment, it or they will receive more attention and the regulation will be improved. The comparative indicators, also, can be made for much less money than absolute indicators, and where ten or twelve are used this makes a large saving.

Instead of a differential galvanometer, I can use a differentially-wound polarized relay, F, Fig. 5, which will close one of two circuits and light one of two lamps, a b, when the pressure is different from that at the absolute indicator. In these galvanometers or relays the resistance of each coil must be, as will be well understood, large enough, when compared with the resistance of the pressure-wires, to bring the difference of potentials to the instrument and not have any noticeable loss on the pressure-wires.

The differential galvanometer or polarized relay may be arranged to close one of two circuits when moved from the normal position, and thus control and cause to operate in one direction or the other any suitable intermediate mechanism, G, Fig. 6, which will throw into and out of circuit an adjustable resistance, R, and in this manner the resistance of a feeder and the pressure at its outer end may be regulated automatically.

In Fig. 6 the arm of differential galvanometer is shown connected constantly with one mercury-trough, c, and standing normally between two others, d e, and in this way, by the connections shown, controlling two circuits to intermediate resistance-adjusting mechanism, G, which is a well-understood apparatus.

What I claim is—

1. The method of producing movement for the indication or regulation of pressure for two or more electrical circuits, consisting in effecting such movement for one circuit directly by the pressure thereat, and effecting such movement for the other circuits by moving instruments by the resultant of electrical forces acting cumulatively or differentially thereon, such forces being derived from the standard circuit and from such other circuits, substantially as set forth.

2. The combination of two or more electrical circuits, an absolute indicator of pressure connected directly with one circuit, and a comparative pressure-indicator for each of the one or more other circuits acted upon differentially or cumulatively by electrical forces derived from the first circuit and one of the other circuits, substantially as set forth.

3. The combination, with two electrical circuits, of two bridge-wires connecting conductors of like polarity of such circuits and a differentially-wound indicating or regulating instrument located in such bridge-wires, for effecting movement for indication or regulation by an electrical comparison between the pressures of the two circuits, substantially as set forth.

4. The combination, with the connected main conductors of a system of electrical distribution and the feeders leading thereto, of one or more absolute pressure-indicators connected with the conductors of the system, and one or more comparative pressure-indicators, each acted upon differentially or cumulatively by electrical forces derived from two points of the system, substantially as set forth.

5. The combination, with the connected main conductors of a system of electrical distribution and the feeders and pressure-wires thereto, of one or two absolute pressure-indicators connected with the conductors of the system, and comparative pressure-indicators connected in bridges between feeder pressure-wires and the circuit or circuits provided with the absolute instrument, substantially as set forth.

6. The combination, with the connected main conductors of a system of electrical distribution and the feeder and pressure-wires thereto, of a local station-circuit provided with an absolute pressure-indicator, and regulating devices and comparative pressure-indicators connected in bridges between the feeder pressure-wires and this local station-circuit, substantially as set forth.

7. The combination, with the connected main conductors of a system of electrical distribution and the feeders and pressure-wires thereto, of a local station-circuit provided with a fixed and an adjustable resistance, an absolute indicator showing pressure across terminals of fixed resistance, and comparative indicators connected by bridge-wires between pressure-wires and the terminals of said fixed resistance, substantially as set forth.

8. The combination, with a standard circuit, of two or more comparative pressure-indicators connected with the same pressure-wires from such standard circuit, substantially as set forth.

9. The combination, with a standard circuit, of two or more comparative pressure-indicators connected with the same pressure-wires from such standard circuit, and separate wires from the standard circuit including one or more absolute pressure-indicators, substantially as set forth.

This specification signed and witnessed this 8th day of April, 1886.

JOHN W. HOWELL.

Witnesses:
  WM. J. LATUS,
  C. A. GUNDAKER.